United States Patent
Jeon et al.

(10) Patent No.: US 12,223,503 B2
(45) Date of Patent: Feb. 11, 2025

(54) CAMERA CONTROL DEVICE AND METHOD TO PROCESS CAPTURED IMAGE USING AT LEAST ONE CAMERA

(71) Applicant: HANWHA TECHWIN CO., LTD., Seongnam-si (KR)

(72) Inventors: Woong Jeon, Seongnam-si (KR); Minsuk Sung, Seongnam-si (KR); Meejee Jeong, Suwon-si (KR); Wookeun Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 880 days.

(21) Appl. No.: 17/414,952

(22) PCT Filed: Nov. 6, 2019

(86) PCT No.: PCT/KR2019/014972
§ 371 (c)(1),
(2) Date: Jun. 17, 2021

(87) PCT Pub. No.: WO2020/130339
PCT Pub. Date: Jun. 25, 2020

(65) Prior Publication Data
US 2022/0060617 A1 Feb. 24, 2022

(30) Foreign Application Priority Data
Dec. 17, 2018 (KR) .................. 10-2018-0162865
Oct. 21, 2019 (KR) .................. 10-2019-0130871

(51) Int. Cl.
*G06Q 20/40* (2012.01)
*G06Q 20/20* (2012.01)
(Continued)

(52) U.S. Cl.
CPC ......... *G06Q 20/4014* (2013.01); *G06Q 20/20* (2013.01); *H04N 23/611* (2023.01);
(Continued)

(58) Field of Classification Search
None
See application file for complete search history.

(56) References Cited

FOREIGN PATENT DOCUMENTS

| GB | 2542452 A | 3/2017 |
|----|-----------|--------|
| JP | 2009-284167 | 12/2009 |

(Continued)

OTHER PUBLICATIONS

International Search Report for International application No. PCT/KR2019/014972 issued on Mar. 6, 2020.

*Primary Examiner* — Heather R Jones
(74) *Attorney, Agent, or Firm* — McLean IP Global; Jason Y. Pahng

(57) ABSTRACT

According to an embodiment of the present invention, a method for processing an image photographed by using at least one camera comprises the following steps of: receiving a first image photographed to have a first image quality through at least one camera; detecting a human object from the first image; generating an event signal when it is detected that a product object is picked up by the human object after the human object is detected in the first image; and acquiring a second image including the human object by controlling the at least one camera to photograph to have a second image quality higher than the first image quality in response to the event signal.

11 Claims, 9 Drawing Sheets

(51) Int. Cl.
*H04N 23/60* (2023.01)
*H04N 23/611* (2023.01)
*H04N 23/661* (2023.01)
*H04N 23/80* (2023.01)

(52) U.S. Cl.
CPC ........... *H04N 23/64* (2023.01); *H04N 23/661* (2023.01); *H04N 23/80* (2023.01)

(56) References Cited

FOREIGN PATENT DOCUMENTS

| | | | | | |
|---|---|---|---|---|---|
| JP | 2009284167 | A | * | 12/2009 | ............... H04N 7/18 |
| JP | 3168049 | | | 6/2011 | |
| JP | 3168049 | U | * | 6/2011 | ............. G08B 25/00 |
| KR | 10-2013-139853 | A | | 12/2013 | |
| KR | 10-2014-0134457 | | | 11/2014 | |
| KR | 10-20170082299 | A | * | 7/2017 | ............... G06K 9/00 |
| KR | 10-2017-0082299 | | | 9/2017 | |
| KR | 10-1668112 | | | 6/2018 | |
| KR | 10-1876433 | | | 7/2018 | |
| WO | WO-2019017720 | A1 | * | 1/2019 | ......... G06K 9/00335 |

* cited by examiner

CAMERA CONTROL DEVICE AND METHOD TO PROCESS CAPTURED IMAGE USING AT LEAST ONE CAMERA

This application is a national stage application, filed under 35 U.S.C § 371, of international patent application number PCT/KR2019/014972, filed on Nov. 6, 2019, which is hereby incorporated by reference in its entirety. In addition, this application claims priority from Korean application number 10-2018-0162865, filed on Dec. 17, 2018, and Korean application number 10-2019-0130871, filed on Oct. 21, 2019, which are hereby incorporated by reference in their entirety.

BACKGROUND OF THE DISCLOSURE

Field of the Disclosure

The present disclosure relates to an image capturing device, and more particularly, to camera control device and method to process a captured image using at least one camera.

Related Art

In general, a store may be equipped with a point-of-sales (POS) terminal to establish a store management system for card payment, sales settlement, inventory management, and other functions necessary for store operation and management. In order to perform such store management more efficiently, many stores may store each customer's mileage accumulation and each customer's product purchase list together with the customer's personal information.

Meanwhile, a camera capturing an image in the store may be installed in many stores, and a user may thus check a theft, which may occur in the store using a captured image of the camera, or a store state. However, it may be bothersome to check every captured image of the camera in order to find the captured image of a desired situation such as the theft. In addition, even though the user finds the captured image of the desired situation, it may be difficult to identify who the corresponding customer is due to a poor quality of the image. If the image capture is performed with a high quality to enable more accurate customer identification, a storage space for storing the captured image may increase. However, given limited resources, this method may be inappropriate.

The description above is provided only to assist in understanding of the background technology of the technical idea of the present disclosure. Therefore, this description should not be regarded as the content corresponding to the prior art known to those skilled in the art to which the present disclosure pertains.

SUMMARY

The present disclosure provides a camera control device using a smaller space to store an image signal while having an improved quality of the image signal capturing a person who picks up a product, and an operation method thereof.

According to an aspect of the present disclosure, a method to process a captured image using at least one camera, includes: receiving a first image captured at a first frame rate by the at least one camera; detecting a human object from the first image; generating an event signal when it is detected that a product object is picked up by the human object after the human object is detected from the first image; and acquiring a second image including the human object by controlling the at least one camera to capture the image at a second frame rate higher than the first frame rate in response to the event signal.

The method may further include: receiving payment information from a point-of-sales (POS) device; and storing the payment information and the second image in a database.

The method may further include: receiving payment information from a point-of-sales (POS) device; providing information related to the detected product object; converting the second image to a third image of a third frame rate depending on whether the related information matches the payment information, the third frame rate being lower than the second frame rate; and storing the payment information and the third image in a database.

The third frame rate may be substantially the same as the first frame rate.

The method may further include storing the payment information and the second image in the database when the related information does not match the payment information.

The storing of the payment information and the second image in the database may further include storing the first image and at least one of the related information in the database.

The providing of the information related to the detected product object may include providing the related information by performing image analysis on the first image.

The providing of the information related to the detected product object may include receiving the related information from an external event detection device.

The method may further include: generating first metadata including information on the gender and age of the human object by performing face recognition on the human object; generating second metadata including information on a product that the human object is interested in by performing at least one of an eye tracking and a head direction tracking on the human object; and relating the first and second metadata to the second image signal and storing the same in the database.

According to another aspect of the present disclosure, a computer device communicating with at least one camera through a network, includes: a communicator; and a processor configured to communicate with the at least one camera through the communicator, wherein the processor is configured to allow: a first image captured at a first frame rate to be received by the at least one camera; a human object to be detected from the first image; an event signal to be generated when it is detected that a product object is picked up by the human object after the human object is detected from the first image; and a second image including the human object to be acquired by controlling the at least one camera to capture the image at a second frame rate higher than the first frame rate in response to the event signal.

The processor may be configured to allow: payment information to be received from an external point-of-sales (POS) device through the communicator; and the payment information and the second image to be stored in a database.

The processor may be configured to allow: payment information to be received from an external point-of-sales (POS) device through the communicator; information related to the detected product object to be generated; the second image to be converted to a third image of a third frame rate depending on whether the related information matches the payment information, the third frame rate being lower than the second frame rate; and the payment information and the third image to be stored in a database.

The processor may be configured to allow: the payment information and the third image to be stored in the database when the related information matches the payment information; and the payment information and the second image to be stored in the database when the related information does not match the payment information.

The processor may be configured to allow the first image and at least one of the related information to be further stored in the database.

The processor may be configured to allow the related information to be generated by performing image analysis on the first image.

Advantageous Effects

As set forth above, the present disclosure may provide the camera control device using a smaller space to store the image signal while having an improved quality of an image signal capturing a person who picks up a product and, and the operation method thereof.

DESCRIPTION OF EXEMPLARY EMBODIMENTS

Hereinafter, exemplary embodiments of the present disclosure are described in detail with reference to the accompanying drawings. It is to be noted that the following description describes only a portion necessary to understand an operation of the present disclosure, and omits the other portion in order not to obscure the gist of the present disclosure. In addition, the present disclosure is not limited to the exemplary embodiments described herein and may be embodied in other forms. The embodiments described herein are only provided to explain the present disclosure in detail so that those skilled in the art to which the present disclosure pertains easily implement the technical idea of the present disclosure.

Throughout the specification, a case in which any portion is referred to as being connected to another portion not only includes a case in which any one portion and another portion are directly connected to each other, but also includes a case in which any one portion and another portion are indirectly connected to each other through another medium. Terms used herein are for describing the specific exemplary embodiments and not for limiting the present disclosure. Throughout this specification, when a certain part "includes" a certain component, this indicates that the part may further include another component instead of excluding another component unless explicitly described otherwise. "At least one of X, Y and Z", and "at least any one selected from the group consisting of X, Y and Z" may be interpreted as one X, one Y or one Z, or may also be interpreted as any combination of two or more of X, Y and Z (for example, XYZ, XYY, YZ or ZZ). Here, 'and/or' may include any combination of one or more of these elements.

Figure 1:
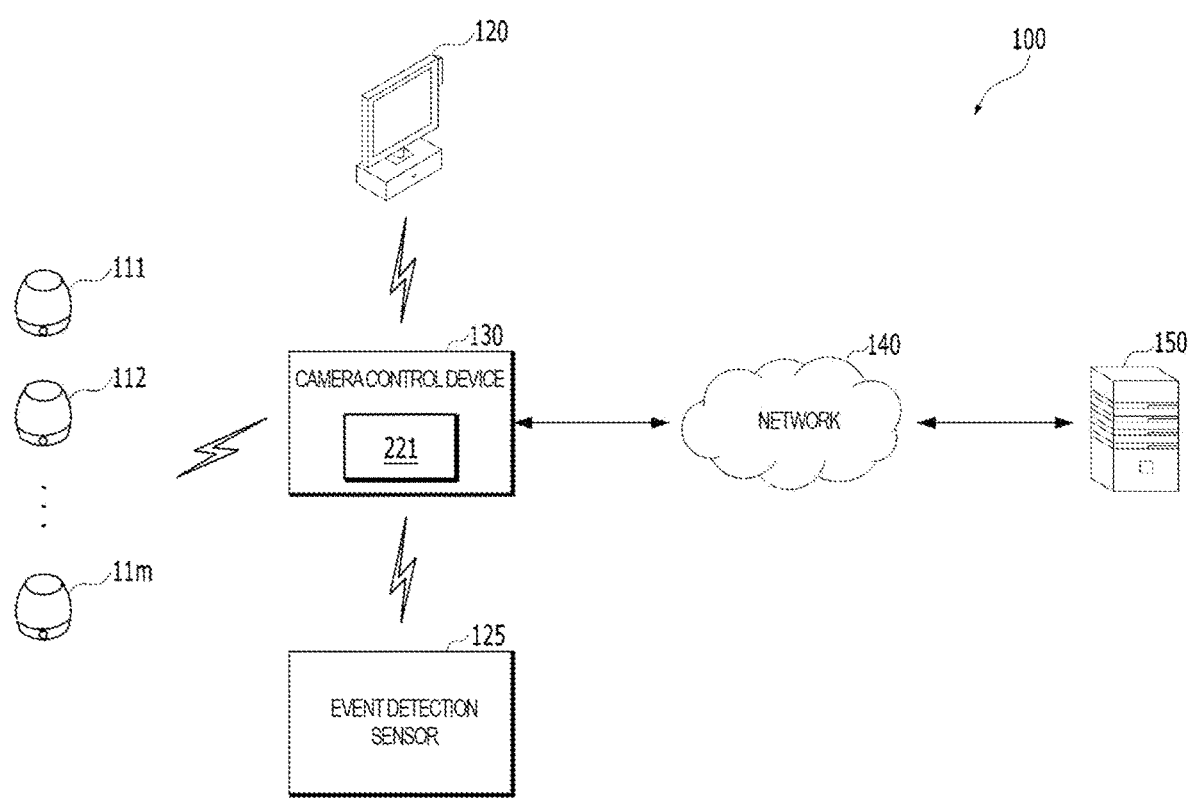
FIG. 1 is a block diagram showing an image capture system according to an exemplary embodiment of the present disclosure.

FIG. 1 is a block diagram showing an image capture system according to an exemplary embodiment of the present disclosure. The image capture system 100 may include a plurality of devices, servers, and/or software components that are operated to perform methods according to the exemplary embodiments described herein. The devices and servers, shown in FIG. 1, may be disposed in different ways, and operations and services provided by such devices and/or servers may be coupled to or separated from each other to perform the exemplary embodiments described herein and may be performed by more or fewer devices and servers. One or more devices and/or servers may be driven by the same or different entities, e.g., companies.

Referring to FIG. 1, the image capture system 100 may include one or more cameras 111 to 11m, a point-of-sales (POS) device 120, an event detection sensor 125, a camera control device 130, a network 140 and a database server 150.

First to m-th cameras 111 to 11m may be configured to generate an image signal by capturing an image and to transmit the generated image signal to the camera control device 130. The first to m-th cameras 111 to 11m may each include, for example, an image sensor converting an optical signal input through a lens to an electronic signal, and a microphone converting a voice to an electronic signal, thereby providing the image signal and a voice signal. The image signal and the voice signal may configure multimedia data, and such multimedia data may be transmitted to the camera control device 130. In the exemplary embodiments, the first to m-th cameras 111 to 11m may each be an internet protocol (IP) camera.

The first to m-th cameras 111 to 11m may each be properly installed to capture a desired target area, and in an exemplary embodiment, it may be assumed that the cameras are installed throughout the store. For example, the target areas of the first to m-th cameras 111 to 11m may be areas adjacent to a sales stand, the POS device 120 and the like, installed in the store.

At least one event detection sensor 125 may be installed at the sales stand. Like a pressure sensor (or pressure transducer) or a weight sensor, the event detection sensor 125 may be configured to detect that a product displayed on the sales stand is moved or removed, i.e. the product is picked up by a person, and to generate a detection signal based thereon. The detection signal may include information related to the moved or removed product, such as information on the sales stand, information on products displayed on the sales stand, information on types of the product displayed on the sales stand, the identification number of the event detection sensor 125, etc.

The POS device 120 may be configured to generate payment information and transmit the generated payment information to the camera control device 130. The POS device 120 may generate the payment information when an item (e.g., product) handled by the store where the POS device is installed is paid. Such payment information may include various types of information such as a paid item, at least one category in which the paid item is included, a payment amount, and purchaser information such as the gender and age of the purchaser. The POS device 120 may identify the item using an integrated circuit (IC) chip, a barcode and the like, attached to the item, the purchaser may request payment of the amount from the POS device 120 using a payment method such as a credit card and an application installed on a mobile phone, and the POS device 120 may communicate with a business server (not shown) through the network 140 to inquire whether or not to approve the payment.

The first to m-th cameras 111 to 11m, the POS device 120 and the event detection sensor 125 may each communicate with the camera control device 130 through short-range wireless communication. For example, the short-range wireless communication may include bluetooth, wireless Fidelity (wifi) communication, LTE device-to-device (D2D) communication, near field communication (NFC), magnetic secure transmission (MST) communication, zigbee communication, infrared data association (IrDA) communication, ultra wideband (UWB) communication, Ant+ communication, and/or communication using at least one communication protocol among the similar types. However, the exemplary embodiments of the present disclosure are not limited hereto. The first to m-th cameras 111 to 11m, the POS device 120, the event detection sensor 125, and the camera control device 130 may communicate with each other through different types of wired/wireless networks.

The camera control device 130 may receive the image signal from the first to m-th cameras 111 to 11m. The camera device 130 may select at least one of the first to m-th cameras 111 to 11m, and receive the image signal from the selected camera. For example, the camera device 130 may include functions to activate and deactivate the image capturing of each camera. The camera control device 130 may communicate with the database server 150 through the network 140 and store the received image signal in the database server 150. The camera control device 130 may further receive the payment information from the POS device 120, relate the received payment information to the image signal, and then store the same in the database server 150.

The network 140 may connect the camera control device 130 and the database server 150 to each other. The network 140 may include at least one of a public network, at least one private network, a wired network, a wireless network, another appropriate type of network, and combinations thereof. The camera control device 130 and the database server 150 may each include at least one of a wired communication function and a wireless communication function, and accordingly, may communicate with each other through the network 140.

FIG. 1 shows that the database server 150 is a component separate from the camera control device 130, and the exemplary embodiments of the present disclosure are not limited hereto. At least a portion of the database server 150 may be integrated into the camera control device 130. In this case, the camera control device 130 may store the image signal and the payment information in the internal database.

The camera control device 130 may include a capture mode control module 221 configured to adjust a frame rate such as the frame rate and/or resolution of the image captured by the first to m-th cameras 111 to 11m. Hereinafter, for convenience of explanation, the exemplary embodiments of the present disclosure are described focusing on adjusting the frame rate of the image captured by the first to m-th cameras 111 to 11m. However, the technical idea of the present disclosure may also be applied to controlling another factor, such as the resolution of the image captured by the first to m-th cameras 111 to 11m.

The first to m-th cameras 111 to 11m may each transmit the image signal to the camera control device 130 by capturing the image at the frame rate of a default value. The capture mode control module 221 may transmit a mode selection signal to the selected camera to increase its frame rate, and accordingly, the selected camera may transmit the image signal of the increased frame rate to the camera control device 130.

Figure 2:
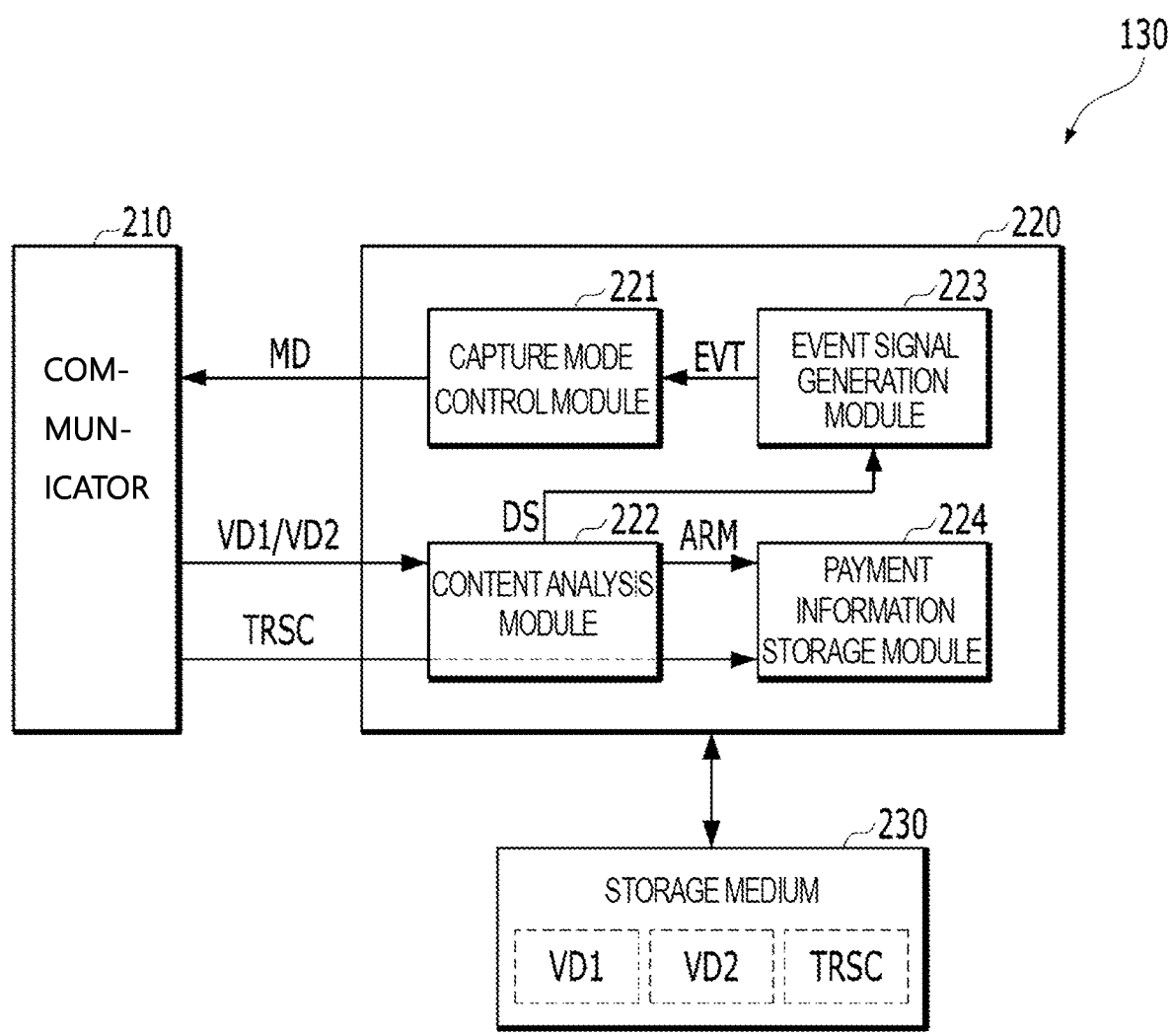
FIG. 2 is a block diagram showing the camera control device of FIG. 1 in more detail.

FIG. 2 is a block diagram showing the camera control device of FIG. 1 in more detail.

Figure 3:
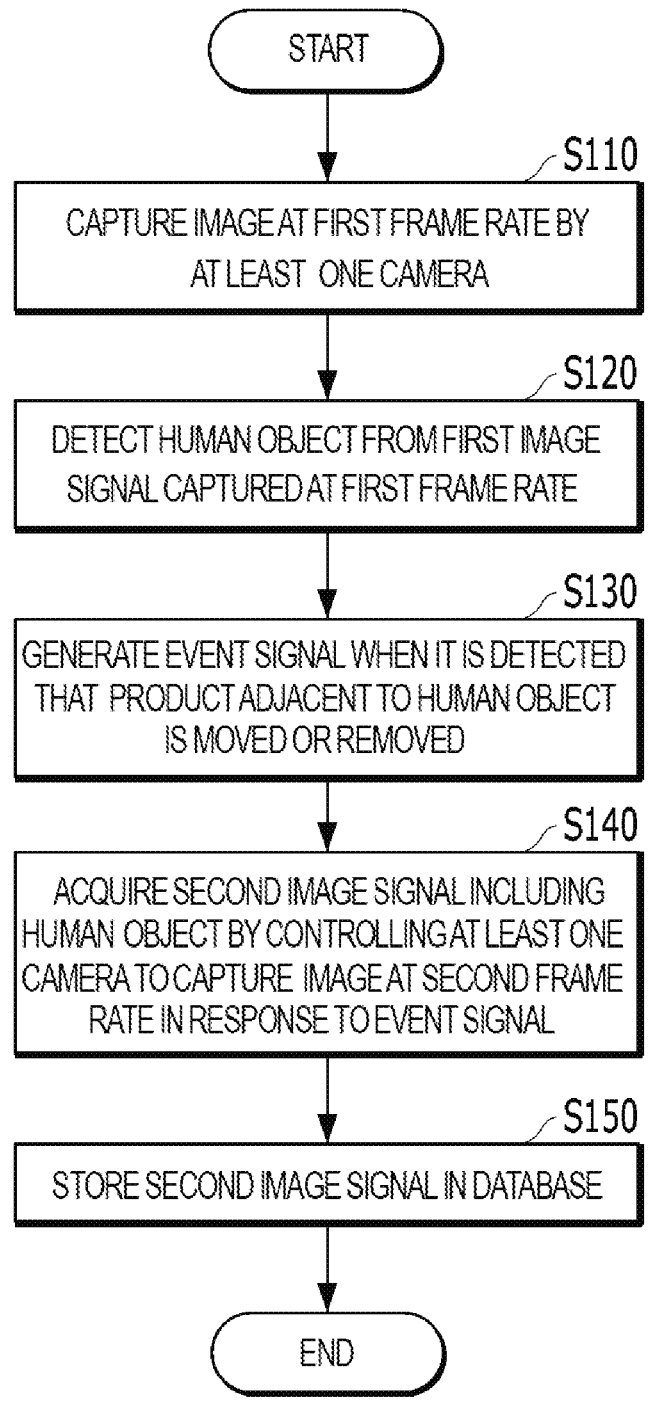
FIG. 3 is a flow chart showing an operation method of a camera control device according to an exemplary embodiment of the present disclosure.

Referring to FIGS. 2 and 3, the camera control device 130 may include a communicator 210, a camera controller 220 and a storage medium 230.

In response to a control of the camera controller 220, the communicator 210 may be configured to perform communication with the first to m-th cameras 111 to 11m, the POS device 120, the event detection sensor 125 and the database server 150. The communicator 210 may include the wired and wireless communication functions.

The camera controller 220 may be connected to the communicator 210 and the storage medium 230. The camera controller 220 may be configured to control an overall operation of the camera control device 130. The camera controller 220 may include the capture mode control module 221, a content analysis module 222, an event signal generation module 223, and a payment information storage module 224.

The capture mode control module 221 may be configured to generate a mode selection signal MD in response to an event signal EVT provided from the event signal generation module 223. For example, the capture mode control module 221 may generate the mode selection signal MD when the event signal EVT is enabled. The generated mode selection signal MD may be transmitted to the selected camera through the communicator 210, and the selected camera may increase its frame rate in response to the mode selection signal MD. That is, the first to m-th cameras 111 to 11m may each capture the image at the first frame rate, and may capture the image at a second frame rate higher than the first frame rate when receiving the mode selection signal.

The content analysis module 222 may receive an image signal of the first frame rate (hereinafter, first image signal VD1) and an image signal of the second frame rate (hereinafter, second image signal VD2) through the communicator 210. Hereinafter, it may be assumed that the first and second image signals VD1 and VD2 are provided by the first camera 111. The first camera 111 may provide the first image signal VD1 before receiving the mode selection signal MD, and may provide the second image signal VD2 after receiving the mode selection signal. However, the exemplary embodiments of the present disclosure are not limited hereto. The first and second image signals VD1 and VD2 may be provided by the plurality of cameras. For example, the first image signal VD1 including a human object being tracked may be provided by the plurality of cameras, and the second image signal VD2 including the human object being tracked may also be provided by the plurality of cameras.

The content analysis module 222 may be configured to detect the human object from the first image signal VD1. In the exemplary embodiments, the content analysis module 222 may detect the human object from the first image signal VD1 through an algorithm such as a human detection algorithm.

The content analysis module 222 may track the detected human object. The content analysis module 222 may use at least one of various object tracking algorithms for tracking the human object. The content analysis module 222 may identify the same human object in the first image signals VD1 of the different cameras through the object tracking algorithm, and track the identified human object. For example, the content analysis module 222 may use a face detection algorithm. Various object tracking algorithms known in this field may be used, and the exemplary embodiments of the present disclosure are not limited hereto.

The content analysis module 222 may store at least a portion of the first image signal VD1 including the tracked human object in the storage medium 230.

The content analysis module 222 may generate a target object detection signal DS when the human object being tracked is positioned in a predetermined area in the first image signal VD1, for example, in an area adjacent to the sales stand. That is, the human object being tracked may be defined as a target object when the human object is positioned in the predetermined area in the first image signal VD1. The target object detection signal DS may be provided to the event signal generation module 223.

The event signal generation module 223 may be configured to generate the event signal EVT based on the detection signal from the event detection sensor 125 and the target object detection signal DS. As described with reference to FIG. 1, generating the detection signal from the event detection sensor 125 may indicate that at least one of the products displayed on the sales stand is moved or removed. In addition, it may be presumed that the product displayed on the sales stand is moved or removed by the human object (i.e., target object) adjacent thereto. The event signal generation module 223 may generate the event signal EVT when the target object detection signal DS is enabled and the detection signal from the event detection sensor 125 is enabled. The generated event signal EVT may be provided to the capture mode control module 221.

The capture mode control module 221 may transmit the mode selection signal MD to the first camera 111 transmitting the first image signal VD1 in response to the event signal EVT. The first camera 111 may provide the second image signal VD2 in response to the mode selection signal MD. The content analysis module 222 may continuously track the human object in the second image signal VD2 and store at least a portion of the second image signal VD2 in the storage medium 230. The content analysis module 222 may relate information related to the moved or removed product, included in the detection signal from the event detection sensor 125 to the second image signal VD2, and may then further store the same in the storage medium 230.

The content analysis module 222 may transmit an alarm signal ARM to the payment information storage module 224 when the human object being tracked in the second image signal VD2 is positioned in an area adjacent to the POS device 120. The area adjacent to the POS device 120 may be predetermined in the second image signal VD2. For example, the content analysis module 222 may generate the alarm signal ARM depending on whether the human object crosses a predetermined virtual line in the second image signal VD2 or overlaps with a predetermined virtual area.

The payment information storage module 224 may receive the payment information TRSC through the communicator 210. The payment information TRSC may be received from the POS device 120 as described with reference to FIG. 1. The payment information TRSC may include various types of information such as a paid product, at least one category in which the paid product is included, the payment amount, and the purchaser information such as the gender and age of the purchaser.

The payment information storage module 224 may determine whether the payment information TRSC is related to the second image signal VD2 based on the alarm signal ARM, and may relate at least a portion of the payment information TRSC to the second image signal VD2 based on a result of the determination, and store the same in the storage medium 230. Whether the payment information TRSC is related to the second image signal VD2 may be determined depending on whether a difference between time when the payment information TRSC is received and time when the alarm signal ARM is received is within threshold time. The payment information storage module 224 may relate at least a portion of the payment information TRSC to the second image signal VD2, and store the same in the storage medium 230 when the difference between the time when the payment information TRSC is received and the time when the alarm signal ARM is received is within the threshold time.

The capture mode control module 221 may be configured to control an overall operation of the camera controller 220. The capture mode control module 221 may output the first and second image signals VD1 and VD2 and the payment information TRSC, stored in the storage medium 230, to the external database server 150, and may store the same therein. The database server 150 may be accessed by a user terminal (not shown), and the user terminal may receive the first and second image signals VD1 and VD2 and the payment information TRSC from the database server 150. It may be identified whether the first and second image signals VD1 and VD2 are related to a theft of the product or a normal payment based on the payment information TRSC. For example, the first and second image signals VD1 and VD2 stored without being related to the payment information TRSC may be related to the theft of the product. The capture mode control module 221 may provide a user alarm when none of the first and second image signals VD1 and VD2 has the payment information TRSC. The user alarm may be displayed on a display device (not shown) of the camera control device 130. It may be identified whether the first and second image signals VD1 and VD2 are related to the theft of the product or the normal payment based on information related to the moved or removed product, included in the detection signal from the event detection sensor 125 and the payment information TRSC. For example, the first and second image signals VD1 and VD2 may be related to the theft of the product when the information related to the moved or removed product does not match a product list of the payment information TRSC. Even in this case, the capture mode control module 221 may provide the user alarm.

The capture mode control module 221, content analysis module 222 and event signal generation module 223 may each be implemented in hardware, software, firmware and combinations thereof, may be coupled to or separated from each other according to an exemplary embodiment, and their functions may be performed by more or fewer modules.

In the exemplary embodiments, the content analysis module 222 may further include at least one of various types of image analysis algorithms capable of detecting whether the product object is picked up by the human object, and may detect the movement or removal of the product object based thereon. For example, the content analysis module 222 may be configured to detect whether the product object deviates from the virtual line in the first image signal VD1. For example, the content analysis module 222 may be configured to determine a representative coordinate value of each product object and detect the product object whose representative coordinate value is changed. For example, the content analysis module 222 may be configured to detect whether a portion (e.g., hand) of the human object being tracked in the first image signal VD1 overlaps with the product object and whether the product object is moved. The content analysis module 222 may detect the movement or removal of the product object using various image analyses, and may generate the event signal EVT based on the detection result. In this case, the event signal generation module 223 may be omitted.

In addition, the content analysis module 222 may be configured to further detect information related to the corresponding product object, such as the information on the sales stand, the information on the products displayed on the sales stand, and information on the types of the products displayed on the sales stand, through an image analysis algorithm. The content analysis module 222 may include the various image analysis algorithms for generating the information related to the product object, may relate the generated information related to the product object to the first image signal VD1 and/or the second image signal VD2, and may then store the same in the storage medium 230. In this case, the event detection sensor 125 of FIG. 1 may be omitted. In the exemplary embodiments, a feature point corresponding to the product object and the information related to the product object may be stored in the storage medium 230 or the database server 150. In this case, the content analysis module 222 may extract the feature point from the product object detected to be moved or removed, and may provide the related information corresponding to a point matching the extracted feature point among the stored feature points. For example, the related information may be text data. In the exemplary embodiments, the content analysis module 222 may further include an optical character reader (OCR) configured to extract the text data from the product object detected to be moved or removed, and at least some of the extracted text data may be provided as the related information. In the exemplary embodiments, a pattern capable of representing a shape of the product object and the information related to the product object may be stored in the storage medium 230 or the database server 150. In this case, the content analysis module 222 may determine the pattern of the product object detected to be moved or removed, and may provide the related information corresponding to a pattern matching the determined pattern among the stored patterns.

In the exemplary embodiments, the database server 150 may store a plurality of images each including a human object, and the content analysis module 222 may be configured to determine whether a human object matches any one of the human objects of the database server 150 when the human object is detected from the first image signal VD1, and to generate the event signal EVT based on a result of the determination. Here, the face detection algorithm may be used to determine the identity of the human object.

According to an exemplary embodiment of the present disclosure, it is possible to store the second image signal VD2 capturing a visitor who picks up the product displayed on the sales stand and the visitor's payment information TRSC. Accordingly, it may be confirmed whether the visitor who picks up the product pays for the product. In addition, based on a user need, it is possible to further store the first image signal VD1 capturing the visitor before the visitor picks up the product displayed on the sales stand.

According to an exemplary embodiment of the present disclosure, the first image signal VD1 of a lower frame rate may be provided before the visitor picks up the product, and the second image signal VD2 of a higher frame rate may be provided when the visitor picks up the product. Accordingly, it is possible to use a smaller storage space to store all the image signals, while securing the image signal of a higher frame rate in relation to the visitor who picks up the product.

FIG. 3 is a flow chart showing an operation method of a camera control device according to an exemplary embodiment of the present disclosure.

Referring to FIGS. 1 and 3, in operation S110, an image may be captured at a first frame rate by at least one camera. Accordingly, the camera control device 130 may receive a first image signal VD1 of the first frame rate.

In operation S120, a human object may be detected and tracked from the first image signal VD1. The camera control device 130 may detect the human object from the first image signal VD1 through appropriate algorithms such as a human detection algorithm and a face detection algorithm, and may track the detected human object.

In operation S130, an event signal may be generated when it is detected that a product adjacent to the human object is moved or removed. In the exemplary embodiments, the camera control device 130 may detect whether the human object being tracked is positioned in a predetermined area in the first image signal VD1, for example, in an area adjacent to the sales stand. In addition, the camera control device 130 may receive a detection signal indicating the movement or removal of a product displayed on the sales stand from the event detection sensor 125 disposed in relation to a sales stand. The camera control device 130 may detect that the product adjacent to the human object is moved or removed when receiving the detection signal from the event detection sensor 125 while the human object is positioned in the predetermined area in the first image signal VD1. The camera control device 130 is here supposed to generate the event signal. In other exemplary embodiments, the camera control device 130 may detect the movement or removal of the product object by including at least one of various types of image analysis algorithms capable of detecting disappearance of an object. In this case, the camera control device 130 may generate the event signal when the movement or removal of the product object is detected. Here, the camera control device 130 may also generate the event signal by further referencing whether the human object is positioned in the predetermined area in the first image signal VD1 (e.g., area adjacent to the sales stand).

In operation S140, a second image signal including the human object being tracked may be acquired by controlling at least one camera to capture the image at a second frame rate in response to the event signal. The camera control device 130 may transmit a mode selection signal MD to a camera currently capturing the human object being tracked, thereby allowing the camera to capture the image at the second frame rate.

In operation S150, a database may store at least a portion of the second image signal VD2 including the corresponding human object.

Figure 4:
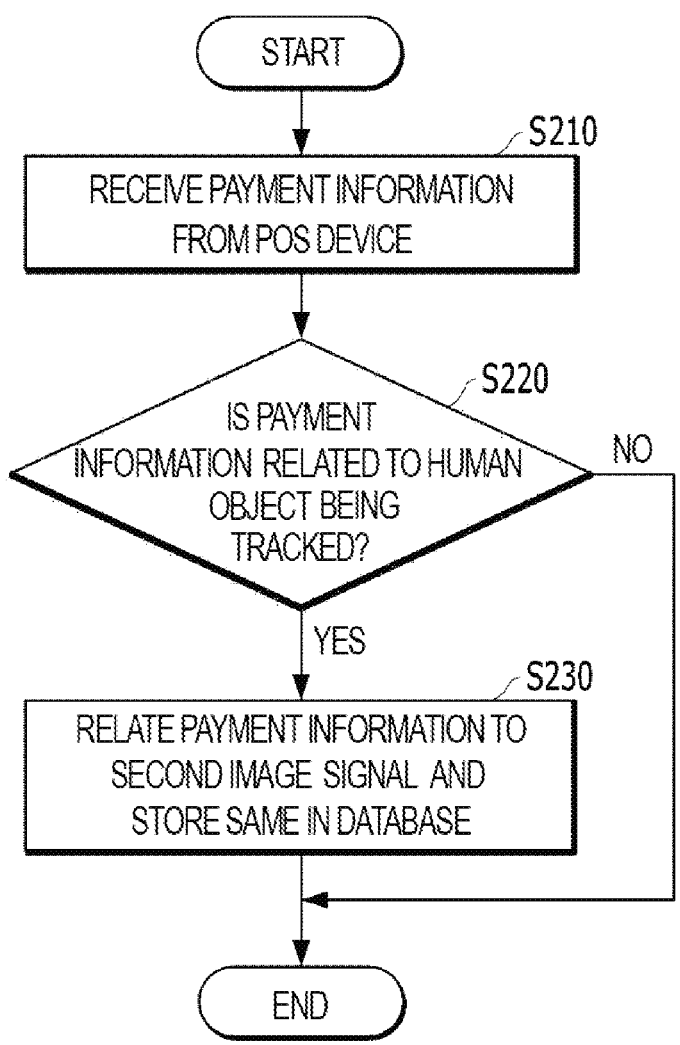
FIG. 4 is a flow chart showing a method of storing an image together with payment information according to an exemplary embodiment.

FIG. 4 is a flow chart showing a method of storing an image together with payment information according to an exemplary embodiment.

Referring to FIGS. 1 and 4, in operation S210, the camera control device 130 may receive payment information from the POS device 120.

In operation S220, the camera control device 130 may determine whether the payment information TRSC is related to the human object being tracked. If this is the case, operation S230 may be performed. If this is not the case, operation S240 may be performed.

The camera control device 130 may detect whether the human object being tracked from the second image signal VD2 is positioned in the area adjacent to the POS device 120. For example, the camera control device 130 may detect whether the human object overlaps with a predetermined virtual area (i.e., area adjacent to 120) in the second image signal VD2. In addition, the camera control device 130 may determine that the payment information TRSC is related to the human object in a case where time when the camera control device 130 receives the payment information TRSC is within threshold time from the time when the human object is positioned in the area adjacent to the POS device 120.

In operation S230, the payment information TRSC may be related to the second image signal VD2 and then stored in the database.

According to an exemplary embodiment of the present disclosure, it is possible to store the second image signal capturing a visitor who picks up the product displayed on the sales stand and the visitor's payment information. Accordingly, it may be confirmed whether the visitor who picks up the product pays for the product. In addition, based on a user need, it is possible to further store the first image signal capturing the visitor before the visitor picks up the product displayed on the sales stand.

According to an exemplary embodiment of the present disclosure, the first image signal of a lower frame rate may be provided before the visitor picks up the product, and the second image signal of a higher frame rate may be provided when the visitor picks up the product. Accordingly, it is possible to use a smaller storage space to store all the image signals, while securing the image signal of a higher frame rate in relation to the visitor who picks up the product.

Figure 5:
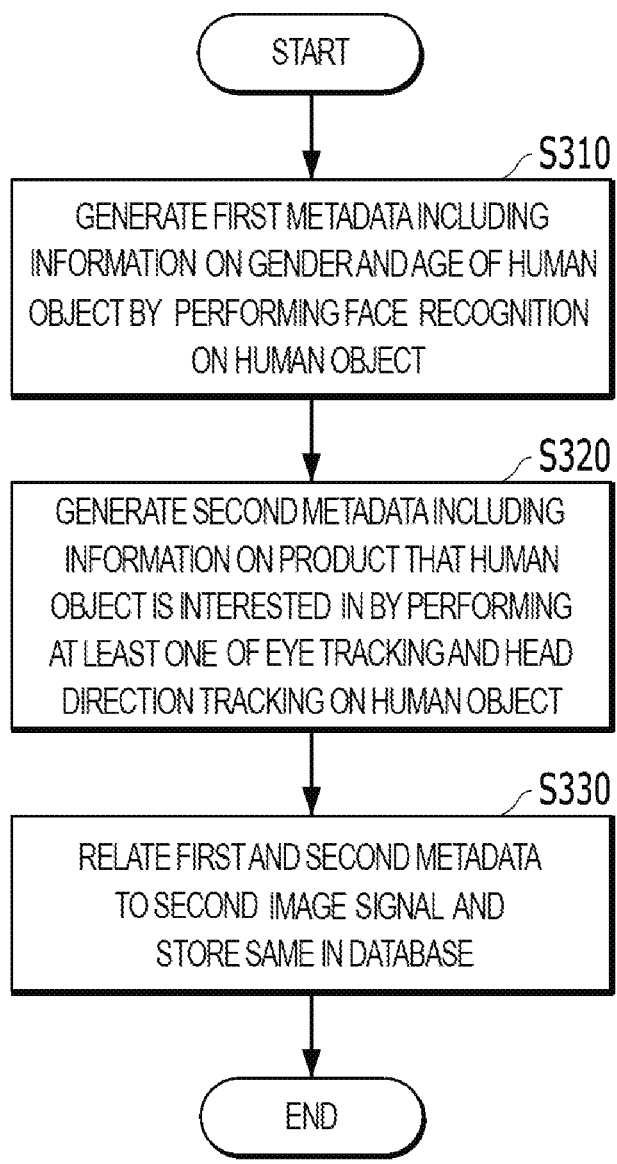
FIG. 5 is a flowchart showing a method of generating and storing metadata related to a human object according to an exemplary embodiment of the present disclosure.

FIG. 5 is a flowchart showing a method of generating and storing metadata related to a human object according to an exemplary embodiment of the present disclosure.

In operation S310, the camera control device 130 may generate first metadata including information on the gender and age of the human object by performing face recognition on the human object. The first metadata may further include information on time in which the moving human object stays in each portion of the image signal.

In operation S320, the camera control device 130 may estimate the product and/or the type of a product that the human object is interested in by performing at least one of an eye tracking and a head direction tracking on the human object, and may generate second metadata including information on the estimated product. The first metadata may be a reference for generating the second metadata.

In operation S330, the camera control device 130 may relate the first and second metadata to the second image signal VD2 and the payment information TRSC, and then store the same in the database. Accordingly, the first and second metadata may be provided together with the second image signal VD2 and the payment information TRSC, which may be used to identify people's purchasing tendencies.

In the exemplary embodiments, the content analysis module 222 of the camera control device 130 described with reference to FIG. 2 may be configured to perform the operations of FIG. 5.

Figure 6:
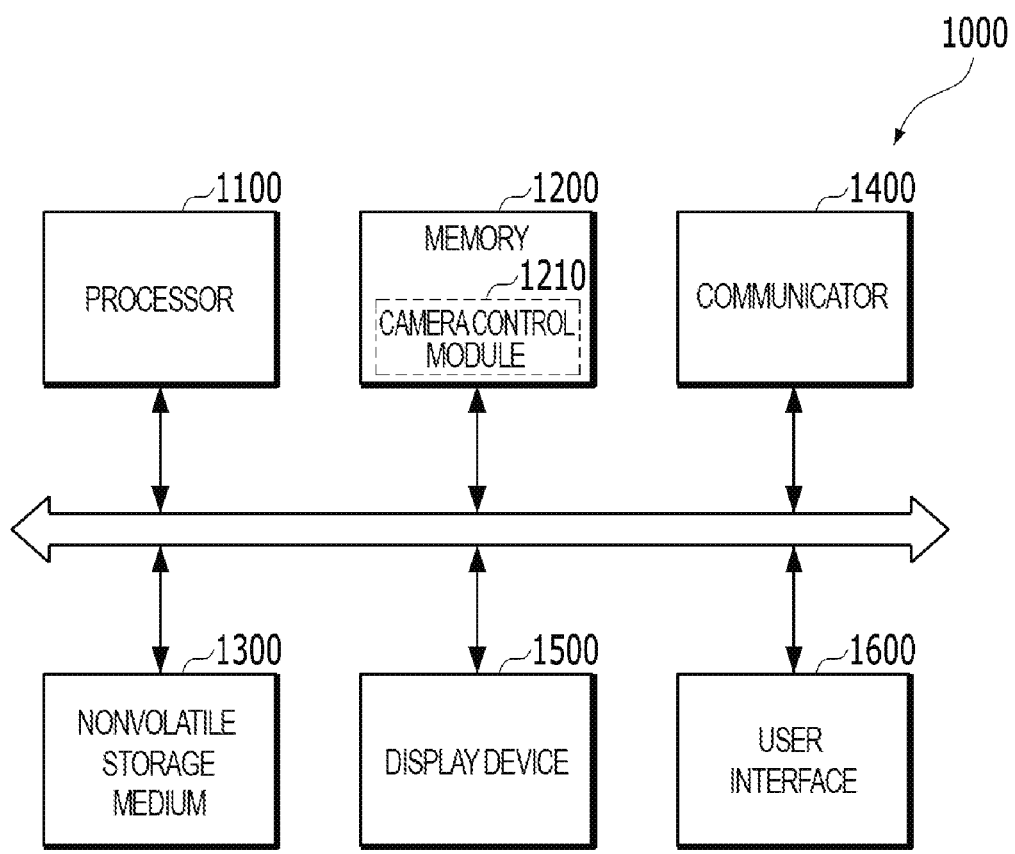
FIG. 6 is a block diagram showing an exemplary computer device for implementing a camera control device.

FIG. 6 is a block diagram showing an exemplary computer device for implementing the camera control device.

Referring to FIG. 6, a computer device 1000 may include a processor 1100, a memory 1200, a nonvolatile storage medium 1300, a communicator 1400, a display device 1500 and a user interface 1600.

The processor 1100 may load an instruction and/or a program code causing the operation and/or the procedure, described with reference to FIGS. 2 to 5, and may allow the loaded instruction and/or the program code to be performed. For example, the processor 1100 may allow a camera control module 1210, which performs the functions of the camera controller 220 of FIG. 2, when allowed by the processor 1100, to be loaded from the nonvolatile storage medium 1300 into the memory 1200, and may allow the loaded camera control module 1210 to be performed.

The memory 1200 may include at least one of various types of memories such as static RAM (SRAM), dynamic RAM (DRAM) and synchronous DRAM (SDRAM). In an exemplary embodiment, the memory 1200 may be used as a working memory of the processor 1100. In another exemplary embodiment, the processor 1100 may include a working memory separate from the memory 1200. The memory 1200 may be provided as the storage medium 230 of FIG. 2. In this case, the memory 1200 may store the first image signal VD1 (see FIG. 2), the second image signal VD2 (see FIG. 2), the information related to the moved or removed product, and the payment information TRSC (see FIG. 2).

The nonvolatile storage medium 1300 may include various types of storage media retaining stored data even when power is cut off, for example, storage media such as a flash memory and a hard disk.

The communicator 1400 (or transceiver) may transmit and receive a signal between the computer device 1000 and another external device. The communicator 1400 may be provided as the communicator 210 of FIG. 2.

The display device 1500 may display information processed by the computer device 1000 under a control of the processor 1100.

The user interface 1600 may detect a user input for controlling an operation of the computer device 1000 and generate corresponding input data. The user interface 1600 may include an input device such as a keypad, a mouse, a fingerprint sensor, a dome switch, a touch pad, or a jog wheel, which may detect a command or information by a user operation.

Figure 7:
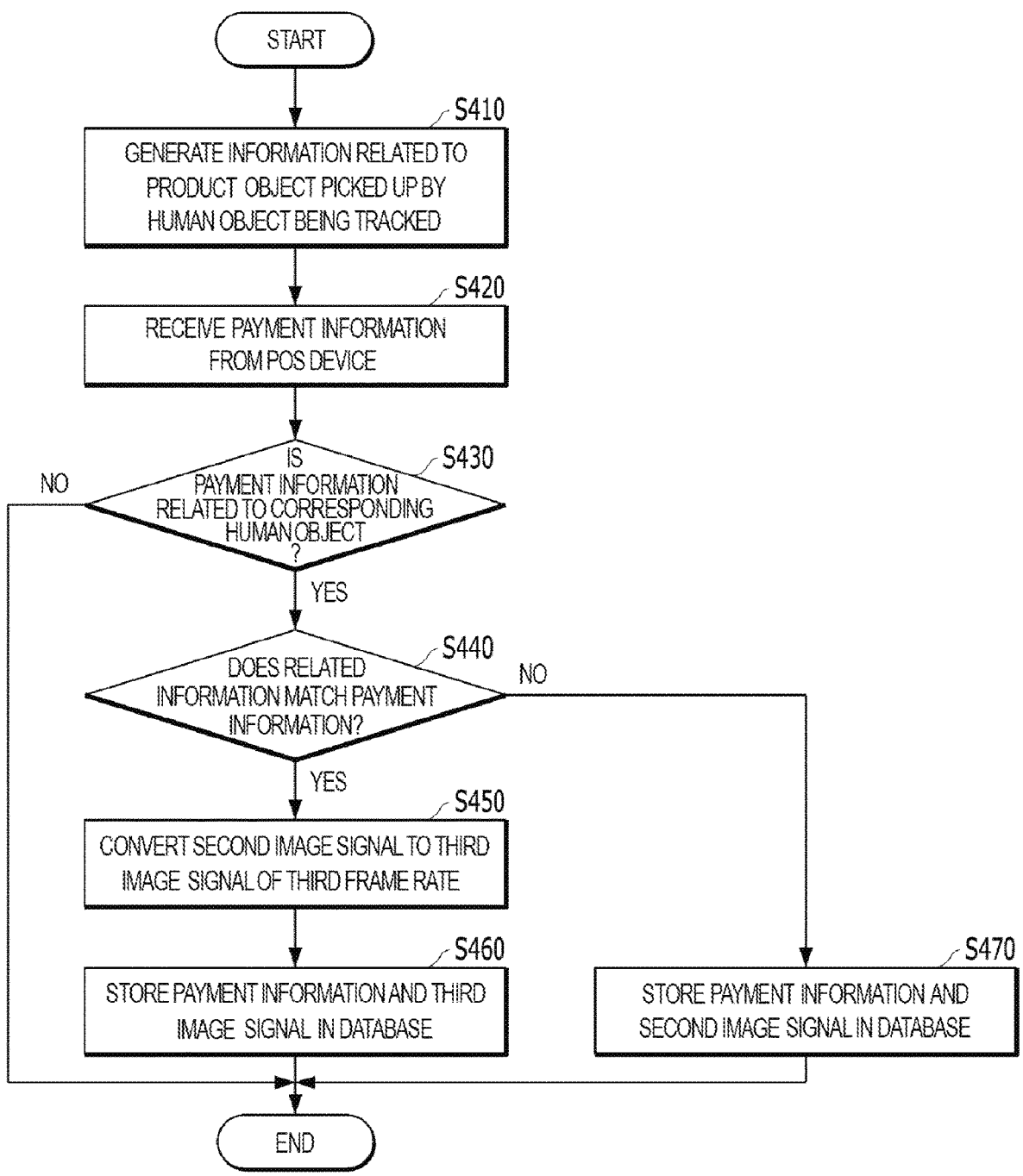
FIG. 7 is a flow chart showing a method of storing an image together with payment information according to another exemplary embodiment.

FIG. 7 is a flow chart showing a method of storing an image together with payment information according to another exemplary embodiment.

Referring to FIGS. 1 and 7, in operation S410, information related to the product object picked up by the human object being tracked may be generated. As described in operations S120 and S130 of FIG. 3, it is possible to detect and track the human object from the first image signal VD1, and detect that the product object is picked up (or moved or removed) by the human object being tracked. Furthermore, in this operation, the information related to the picked-up product object may be generated. In the exemplary embodiments, the camera control device 130 may receive the detection signal including the information related to the picked-up product object from the event detection sensor 125, as described above. In other exemplary embodiments, the camera control device 130 may identify the picked-up product object and generate the related information through the various image analysis algorithms.

In operation S420, the camera control device 130 may receive the payment information TRSC from the POS device 120.

In operation S430, the camera control device 130 may determine whether the payment information TRSC is related to the human object being tracked. If this is the case, operation S440 may be performed.

In operation S440, the camera control device 130 may determine whether the related information matches the payment information TRSC. If this is the case, operation S450 may be performed. If this is not the case, operation S470 may be performed.

In operation S450, the camera control device 130, for example, a payment information storage module 224 (see FIG. 2) may convert the second image signal VD2 to a third image signal of a third frame rate. The third frame rate may be lower than the second frame rate corresponding to the second image signal VD2. As described above, the camera control device 130 may convert the second image signal VD2 to the third image signal having the lower frame rate. The third frame rate may be substantially the same as the first frame rate corresponding to the first image signal VD1.

In operation S460, the payment information TRSC and the third image signal may be stored in the database. In this case, the second image signal VD2 remaining in the memory or storage medium 230 may be deleted. In operation S470, the payment information TRSC and the second image signal VD2 may be stored in the database. In operations S460 and S470, the first image signal VD1 and the related information may be further stored in the database.

If the product list based on the related information matches the product list of the payment information TRSC, the corresponding image information may be an image capture of a normal purchasing behavior. In this case, the camera control device 130 may convert the second image signal VD2 of the second frame rate to the third image signal VD3 of the lower third frame rate and store the third image signal in the database. The storage space of the database may thus be saved. If the product list based on the related information does not match the product list of the payment information TRSC, the corresponding image signal may be related to a theft of the product. In this case, the camera control device 130 may store the second image signal VD2 of a higher second frame rate in the database. It is possible to use a smaller storage space to store the image signals while securing the higher frame rate image signal in relation to the visitor related to the theft of the product.

Figure 8:
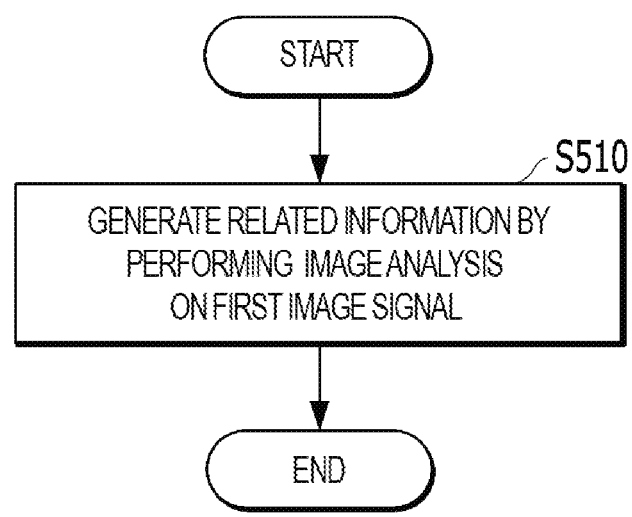
FIG. 8 is a flow chart showing a method of generating information related to a product object according to an exemplary embodiment.

FIG. 8 is a flow chart showing a method of generating information related to a product object according to an exemplary embodiment.

In operation S510, the camera control device 130 may generate information related to the picked-up product object by performing image analysis on the first image signal VD1. The camera control device 130 may include various image analysis algorithms for generating the information related to the product object. For example, a feature point corresponding to the product object and the information related to the product object may be stored in the storage medium 230 (see FIG. 2) or the database server 150, and the camera control device 130 may extract the feature point from the picked-up product object, and may provide the related information corresponding to a point matching the extracted feature point among the stored feature points. As another example, a pattern capable of representing a shape of the product object and the information related to the product object may be stored in the storage medium 230 or the database server 150, and the camera control device 130 may determine the pattern of the picked-up product object, and may provide the related information corresponding to a pattern matching the determined pattern among the stored patterns. In the exemplary embodiments, the related information may be text data.

Figure 9:
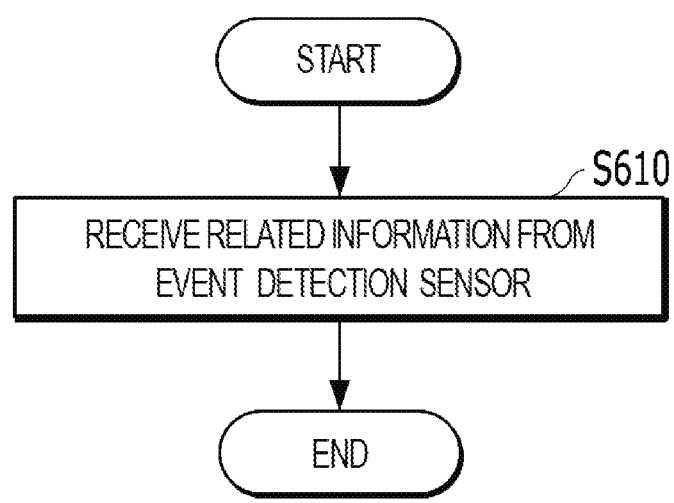
FIG. 9 is a flow chart showing a method of generating information related to a product object according to another exemplary embodiment.

FIG. 9 is a flow chart showing a method of generating information related to a product object according to another exemplary embodiment.

In operation S610, the camera control device 130 may receive the related information from the event detection sensor 125. Like a pressure sensor or a weight sensor, the event detection sensor 125 may be configured to detect that a product displayed on the sales stand is picked up, and to generate the detection signal based thereon. The detection signal may include the information related to the picked-up product, such as information on the sales stand, information on products displayed on the sales stand, information on types of the products displayed on the sales stand, the identification number of the event detection sensor 125, etc.

Although the specific exemplary embodiments have been described hereinabove, they are provided only for assisting in the entire understanding of the present disclosure. Therefore, the present disclosure is not limited to the exemplary embodiments. Various modifications and changes may be made from this description by those skilled in the art to which the present disclosure pertains.

Accordingly, the spirit of the present disclosure should not be limited to the above-described exemplary embodiments and the following claims as well as all modified equally or equivalently to the claims are intended to fall within the scope and spirit of the present disclosure.

What is claimed is:

1. A method to process a captured image using at least one camera, the method comprising:
    receiving a first image captured at a first frame rate by the at least one camera;
    detecting a human object from the first image;
    generating an event signal when it is detected that a product object is picked up by the human object after the human object is detected from the first image;
    acquiring a second image including the human object by controlling the at least one camera to capture the image at a second frame rate higher than the first frame rate in response to the event signal;
    receiving payment information from a point-of-sales (POS) device;
    providing information related to the detected product object;
    converting the second image to a third image of a third frame rate depending on whether the related information matches the payment information, the third frame rate being lower than the second frame rate; and
    storing the payment information and the third image in a database.

2. The method of claim 1, wherein the third frame rate is substantially the same as the first frame rate.

3. The method of claim 1, further comprising:
    storing the payment information and the second image in the database when the related information does not match the payment information.

4. The method of claim 3, wherein the storing of the payment information and the second image in the database further includes storing the first image and at least one of the related information in the database.

5. The method of claim 1, wherein the providing of the information related to the detected product object includes providing the related information by performing image analysis on the first image.

6. The method of claim 1, wherein the providing of the information related to the detected product object includes receiving the related information from an external event detection device.

7. The method of claim 1, further comprising:
generating first metadata including information on the gender and age of the human object by performing face recognition on the human object;
generating second metadata including information on a product that the human object is interested in by performing at least one of an eye tracking and a head direction tracking on the human object; and
relating the first and second metadata to the second image signal and storing the same in the database.

8. The computer device communicating with at least one camera through a network, the computer device comprising:
a communicator; and
a processor configured to communicate with the at least one camera through the communicator,
wherein the processor is configured to allow:
a first image captured at a first frame rate to be received by the at least one camera;
a human object to be detected from the first image;
an event signal to be generated when it is detected that a product object is picked up by the human object after the human object is detected from the first image; and
a second image including the human object to be acquired by controlling the at least one camera to capture the image at a second frame rate higher than the first frame rate in response to the event signal;
payment information to be received from an external point-of-sales (POS) device through the communicator;
information related to the detected product object to be generated;
the second image to be converted to a third image of a third frame rate depending on whether the related information matches the payment information, the third frame rate being lower than the second frame rate; and
the payment information and the third image to be stored in a database.

9. The computer device of claim 8, wherein the processor is configured to allow:
the payment information and the third image to be stored in the database when the related information matches the payment information; and
the payment information and the second image to be stored in the database when the related information does not match the payment information.

10. The computer device of claim 9, wherein the processor is configured to allow the first image and at least one of the related information to be further stored in the database.

11. The computer device of claim 8, wherein the processor is configured to allow the related information to be generated by performing image analysis on the first image signal.

* * * * *